United States Patent [19]

Hugon et al.

[11] 3,928,803

[45] Dec. 23, 1975

[54] DISTRIBUTION FUNCTION ANALYZER FOR MEASURING TELEPHONE EQUIPMENT HOLDING TIMES

[76] Inventors: Jean H. Hugon, 63, Avenue du General de Gaulle, 94240 L'Hay-les-Roses; Jean Brosseron, 2, rue des Peupliers, 91630 Marolles-en-Urepoix; Pierre J. Lignères, 80 bis, rue des Mures, 92160 Antony, all of France

[22] Filed: Nov. 4, 1974

[21] Appl. No.: 520,645

[52] U.S. Cl. ............... 324/181; 324/77 R; 324/102; 235/181
[51] Int. Cl.² ........................................... G04F 8/00
[58] Field of Search .......... 235/181; 324/181, 77 R, 324/102; 328/109

[56] References Cited
UNITED STATES PATENTS

| | | | |
|---|---|---|---|
| 3,505,598 | 4/1970 | Merrill | 324/77 R |
| 3,510,765 | 5/1970 | Baessler | 324/181 |
| 3,735,261 | 5/1973 | Vahlstrom | 324/102 |

Primary Examiner—R. V. Rolinec
Assistant Examiner—Michael J. Tokar
Attorney, Agent, or Firm—Abraham A. Saffitz

[57] ABSTRACT

Analyzer unit for measuring the durations of signals and for classifying in a distribution function the duration measurement values in function of their deviations in relation to a nominal duration value. This analyzer unit includes means for sampling signals all having the same nominal duration value $\tau$ with a preset recurrence period and means for storing a predetermined number of duration measurement values. A duration increment $\Delta\tau$ is selected and entered into the unit. This increment and multiples thereof are added and subtracted from the nominal duration value. The stored duration values are applied to a plurality of comparators each having a lower and an upper digital limits and defining adjacent time slots, the upper and lower limits of a given time slot being respectively equal to $(\tau - n\,\Delta\tau)$ and $(\tau - (n-1)\,\Delta\tau)$ where $n$ is an integer. A plurality of counters are respectively associated with the comparators and receive therefrom counting pulses when the durations of the applied duration values respectively fall within the time slots of the comparators.

3 Claims, 8 Drawing Figures

DISTRIBUTION FUNCTION ANALYZER FOR MEASURING TELEPHONE EQUIPMENT HOLDING TIMES

CROSS REFERENCE TO RELATED APPLICATIONS

French patent application No. P.V. 73-39367 filed Nov. 6, 1973 under which priority is claimed under 35 U.S.C. 119.

BACKGROUND OF THE INVENTION

1. Field of the Invention

This invention relates to an analyzer for determining the distribution function of deviation amounts of a variable with respect to a preset value and more particularly to a device for determining such a distribution function where the variable is the time that a telephone equipment is kept working during each call or the hold time between two phases of a telephone call, for instance handset pick up and dial tone availability.

2. Description of the Prior Art

Analyzers have been developed in the prior art for determining the distribution functions of telephone equipment hold time. These analyzers include a multi-position distributor with an individual register for each position, a start-and-end of busy period aknowledgement circuit and a reset circuit. Busy period data recording generates distributor advance from position to position at a fixed rate for the duration of said busy period. The end of each busy period (end of data input) is detected by the analyzer and specific register linked with this distributor position outputs current. Shortly afterwards, the distributor is returned to its normal position to standby for next busy period data input. This stepping action of the distributor is repeated for each busy period, in function of subsequent data input and each time the appropriate register operates in compliance with the final output position to which the distributor has advanced.

Each distributor position output with its associated register represents a unique range of hold times and thus, over a period of time, each register will be operating a number of times to agree with the number of times that the observed equipment was held busy for the time duration represented thereby. By this expedient, the setting of registers at the end of an analyzing period represents the desired distribution of equipment hold times.

The particular hold timing represented by each distributor position output is determined in part by the type of equipment under observation. For instance, if maximum hold time to be analyzed is 60 seconds and if observations are made once a second, a 10-position distributor could be used with each position representing a range of 6 seconds. The first distributor output position, together with its register, would then represent the range of 0-5 seconds, the second 6-11 seconds, the third 12-17 seconds, and so on up to the last position which would represent 54-59 seconds.

Continuing with this example, if the received information for the first busy period represents a holding time of 3 seconds, the distributor would remain in its first position and the register connected thereto would be operated upon the end of this busy period. If the received information for the second busy period represents a holding time of 57 seconds, the distributor would advance to its tenth position during the reception of this information and the register connected thereto would operate upon the termination of the busy period.

This type of analyzer is suitable for measuring hold times comprised between a unit hold time and a maximum hold time that is equal to a small multiple of said unit hold time. In the above-indicated instance, in which the unit hold time is 6 seconds and the maximum hold time is 60 seconds, 10 registers are associated with the distributor. With the knowledge that the invention is intended to define small time incremented distribution in addition or in substraction to a relatively large standard hold or standby time interval, use of prior art analyzers would necessitate a great number of registers.

OBJECTS OF THE INVENTION

The object of the invention is to provide a time duration analyzer adapted to the measuring and storing of a plurality of hold or standby times of an observed telephone equipment and to distribute the values of these times in time slots or time windows in function of small deviations from their standard values. That standard value of hold or standby time, together with time slot width, can be selected by the operator.

Another object of the invention is to provide a time duration analyzer adapted to derive the mean value of a hold time from a plurality of measurements of said hold time.

SUMMARY OF THE INVENTION

The analyzer of the invention measures a plurality of hold times of an observed telephone equipment, for instance a relay or flip-flop, or a plurality of dialing tone waiting durations in an observed subscriber equipment and then stores the measured time values. Then it processes the gathered observations by splitting the measured durations into a number of adjacent time windows or slots and, in the columns of a display console for said slots, it posts the number of observations whose durations fall within the limits of the slots. The histogram thereby derived is obviously function of the time values defining the slot limits. The unit stores the various time measurements and it is possible to process several times the recorded data by changing each time the expected mean time value and window width to displace, expand or contract the variable time histogram. Specifically, the time range covered by the unit is 20 ms to 2.5 s with a 10 ms accuracy, or 100 ms to 25.5 s with a 100 ms accuracy.

BRIEF DESCRIPTION OF THE DRAWINGS

The invention will be now described in detail pursuant to and in compliance with the accompanying drawings, in which.

DESCRIPTION OF THE PREFERRED EMBODIMENTS

Figure 1:
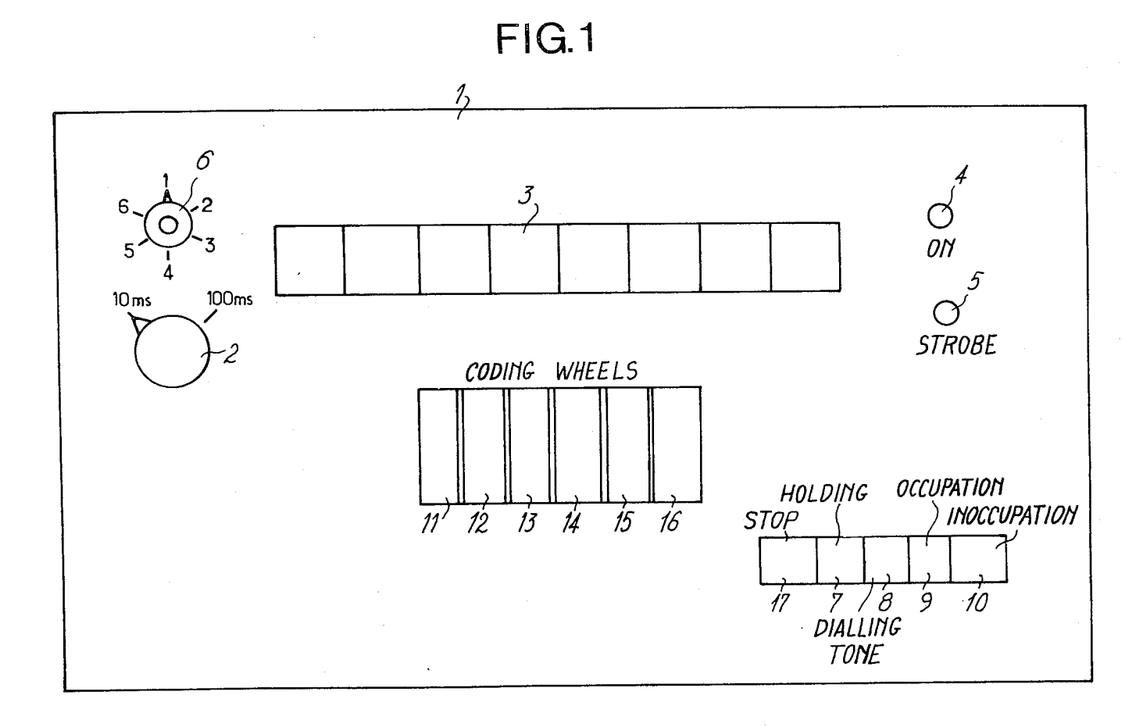
FIG. 1 represents unit front facing.

The distribution function analyzer of the invention assumes the outline of the portable unit 1. On front facing is located (FIG. 1)

a button 2 to select measurement accuracy, 10 ms or 100 ms, and therefore the whole range covered by the unit;

a display board 3 depicting the histogram;

a "go-ahead" indicator light (green) 4 which when it lights up invites the user to feed the computer with required parameters;

a push-button "validation" 5 which when the light 4 goes on validates the parameters fed into the computer;

a group of six coding wheels, 11 to 16, on which the user inscribes the data needed by the computer. The coding wheels accept pheripheral decimal digits and when one of these digits is facing a specific index, a register linked to a coding wheel is positioned on the binary value of this decimal digit. The use of coding wheels for entering data into a computer is known in the art. Ths coding wheels are used, among other uses, to display the nominal time values and window widths, said times being expressed with the clock periodicity as a unit. For instance, if the clock is set on its 10 ms period, a nominal value of 1 second will be written 100 and a 250 ms window will be written as 025.

a six-position switch 6;

an "order" button 7, starting the order time measuring chain;

a button for "tone" 8 triggering the tone standby measuring chain;

a button "busy" 9 setting the unit into the busy measuring position;

a "clear" button 10 when the unit is positioned to measure unused time;

a "cut off" button 17 to allow for computer cut off.

Figure 2:
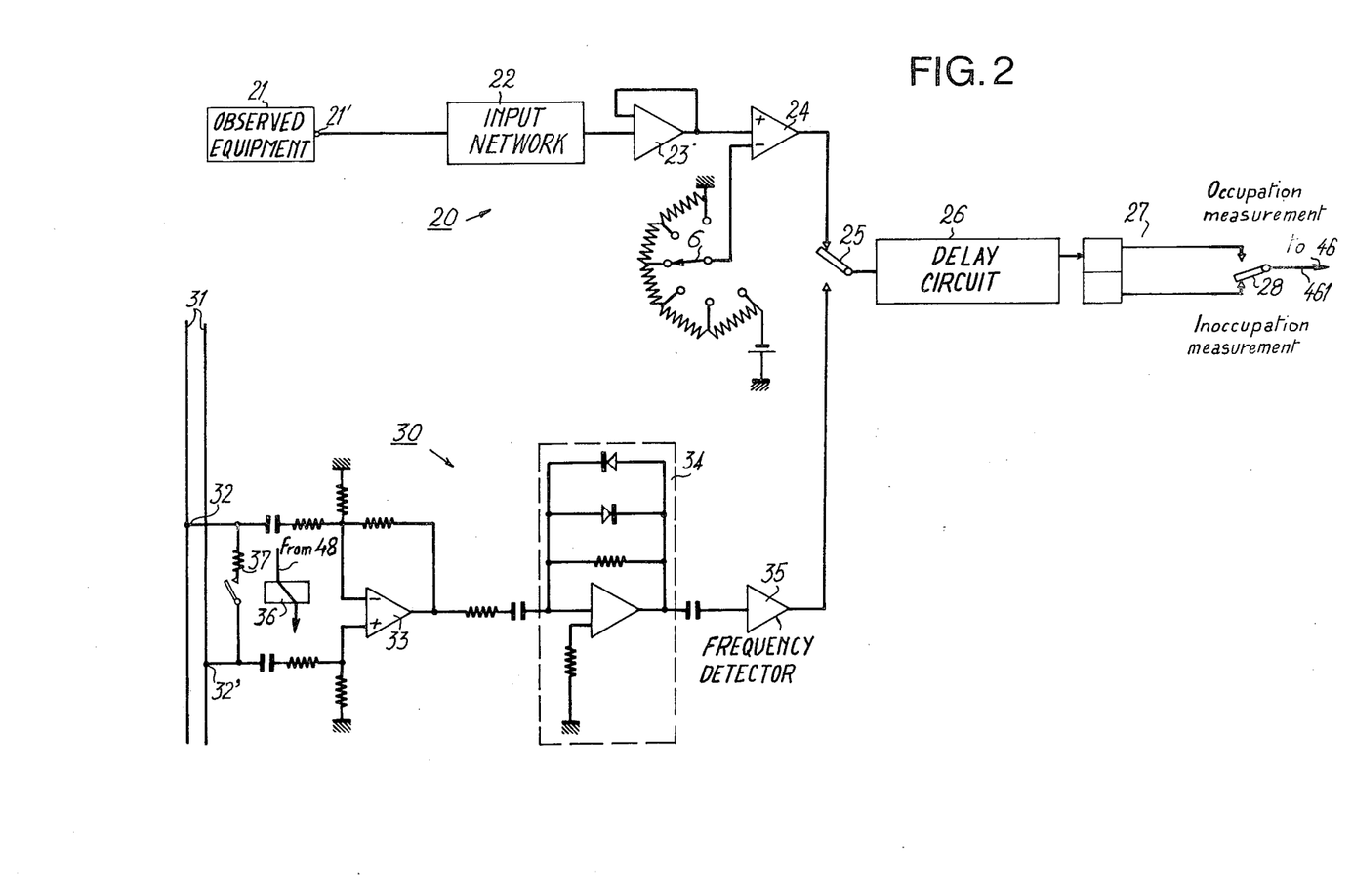
FIG. 2 shows the standby time detection chain and the waiting time detection chain.

Now referring to FIG. 2, the hold time measuring chain 20 is linked at point 21' with the observed equipment from which the start and end of the times to be measured and stored are extracted, or from which the signals themselves whose durations are to be measured and stored are picked. Terminal 21' is linked to an input network 22 which is an attenuation and clamping network and its purpose is to gather within preset limits the amplitude of the input signal. Input network 22 is linked to a voltage follower stage 23, then to a differentiel amplifier 24 whose second input can be given a voltage with a preselected value among several available values owing to switch 6. In a unit developed by the applicants, voltage values provided by this switch are $-2, -8, -16, -24, -32, -40$ volts.

The differential amplifier 24 output signal with its amplitude being substantially 5 volts is applied through inverter 25 controlled by order button 7 and tone button 8 to a delay circuit 26 and a bistable flip-flop 27. The purpose for this delay circuit is to validate the order time so that it is at least equal to a preset value, for instance 10 ms, in order to avoid processing stray signals.

Flip-flop 27 is followed by an inverter 28 controlled by busy button 9 and clear button 10 so that busy time to clear time of a given equipment can be effected.

The tone standby measuring chain 30 is linked at points 32, 32' to a telephone line 31. It includes a differential amplifier 33, a voltage limiter 34 and a frequency detector 35. It joins hold time measuring chain 20 to inverter 25. The tone standby measuring chain also includes a relay 36 controlled by the computer to loop line wires over a resistor 37 of 800 ohms, thereby simulating a subscriber handset pick up. Relay 36 is controlled by computer programming, as shall later be explained.

The unit includes a microcomputer 40 (FIG. 3) controlled by a time base 41 dispatching signals to it, $\phi_1$ and $\phi_2$ (FIG. 4), as well as peripheral logic circuits.

Figure 3:
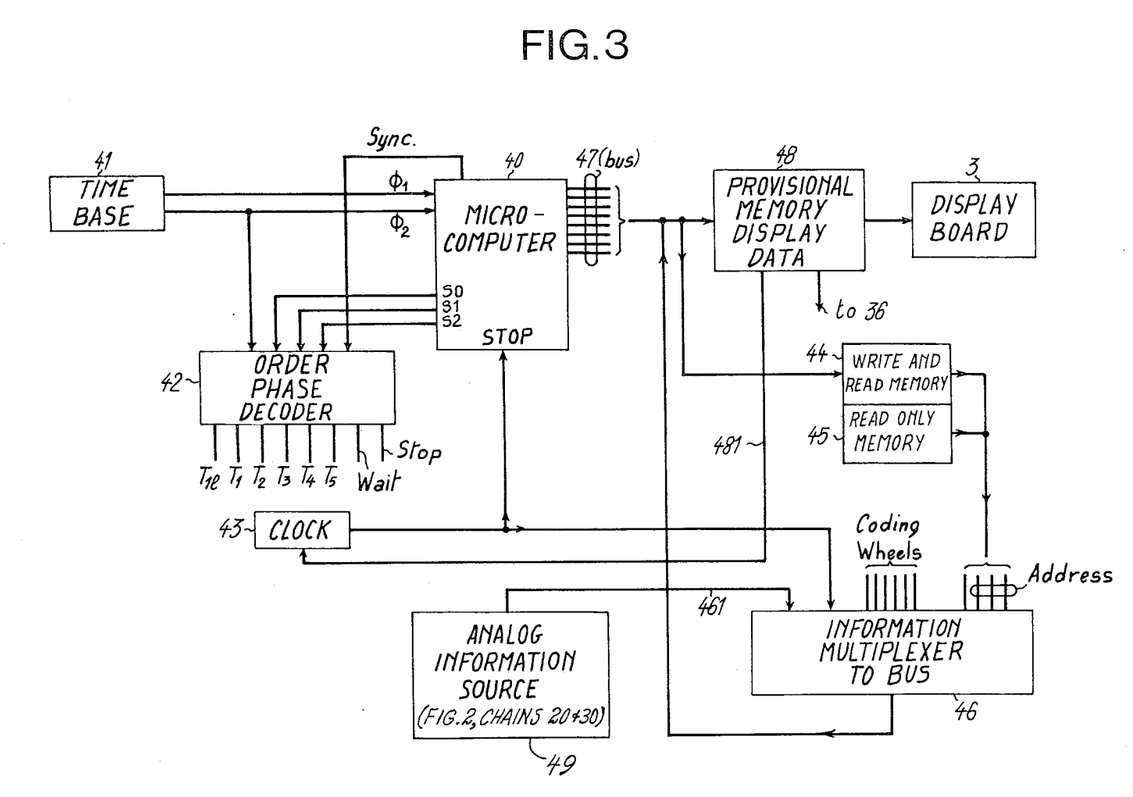
FIG. 3 is a block diagram of the unit logic portion.
Figure 4:
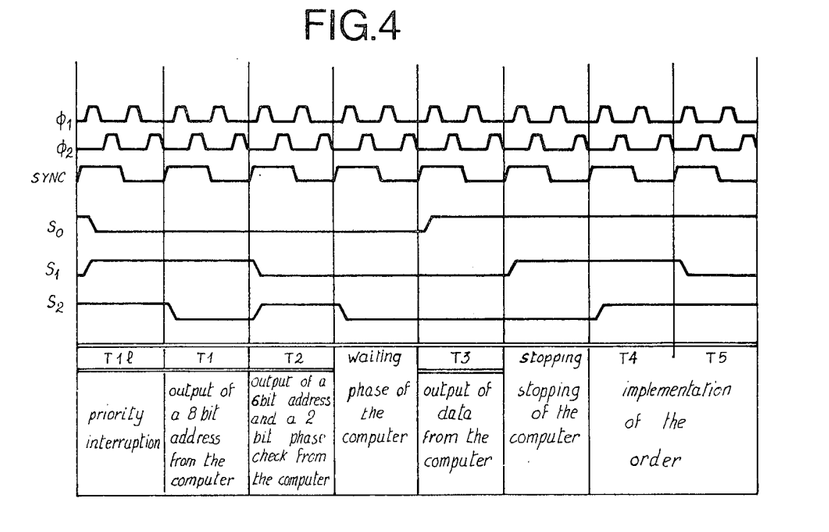
FIG. 4 is a time diagram for the operating computer in the unit.

These logic circuits include:

a decoder 42 which receives from the computer 40 a series of three bits, $S_0\ S_1\ S_2$, defining the instruction phase being implemented and also signals $\phi_1\ \phi_2$ emitted by time base 41, and a sync signal emitted by computer 40 to define times $T_{1l}, T_1, T_2, T_3, T_4, T_5$, corresponding to instruction phases given on FIG. 4, as well as to standby and stop periods. Time $T_{1l}$ corresponds to a priority interrupt signal coming from clock 43 setting the frequency at which the signal provided by the equipment under observation is to be analyzed or sampled. The sampling period is 10 ms or 100 ms depending on user preselection (handoing of button 2 of FIG. 1) corresponding to sampling frequencies 100 Hz and 10 Hz respectively;

a read-and-write memory 44 and a read-only memory 45, storing respectively the time measurements and the parameters (hold time standard value and slot widths) as regards the read-and-write memory and programming instructions as regards the read-only memory. Detection by the microcomputer of a clock priority call from clock 43 triggers special time $T_{1l}$ at end of current instruction, used for storing this call in read-and-write memory 44;

an information multiplexer toward bus 46. Data to transmit by the multiplexer to the computer emerge either from read-and-write memory 44 or from read-only memory 45, or again from coding wheels 11-16, or the clock 43, or the analog information source 49 formed by the hold time measuring chain 20 and the tone standby measuring chain 30. The correct distribution of such data to the microcomputer 40 is insured by timing multiplexing allowing access of requested data by the computer to the bus in function of address received by the multiplexer from this computer.

The exchange of data between the computer and logic circuits is done in prallel by means of a 8-wire bus 47. The memory 48 is used to store data to the display board 3 which has 16 luminous digits grouped two by two per window.

Figure 5:
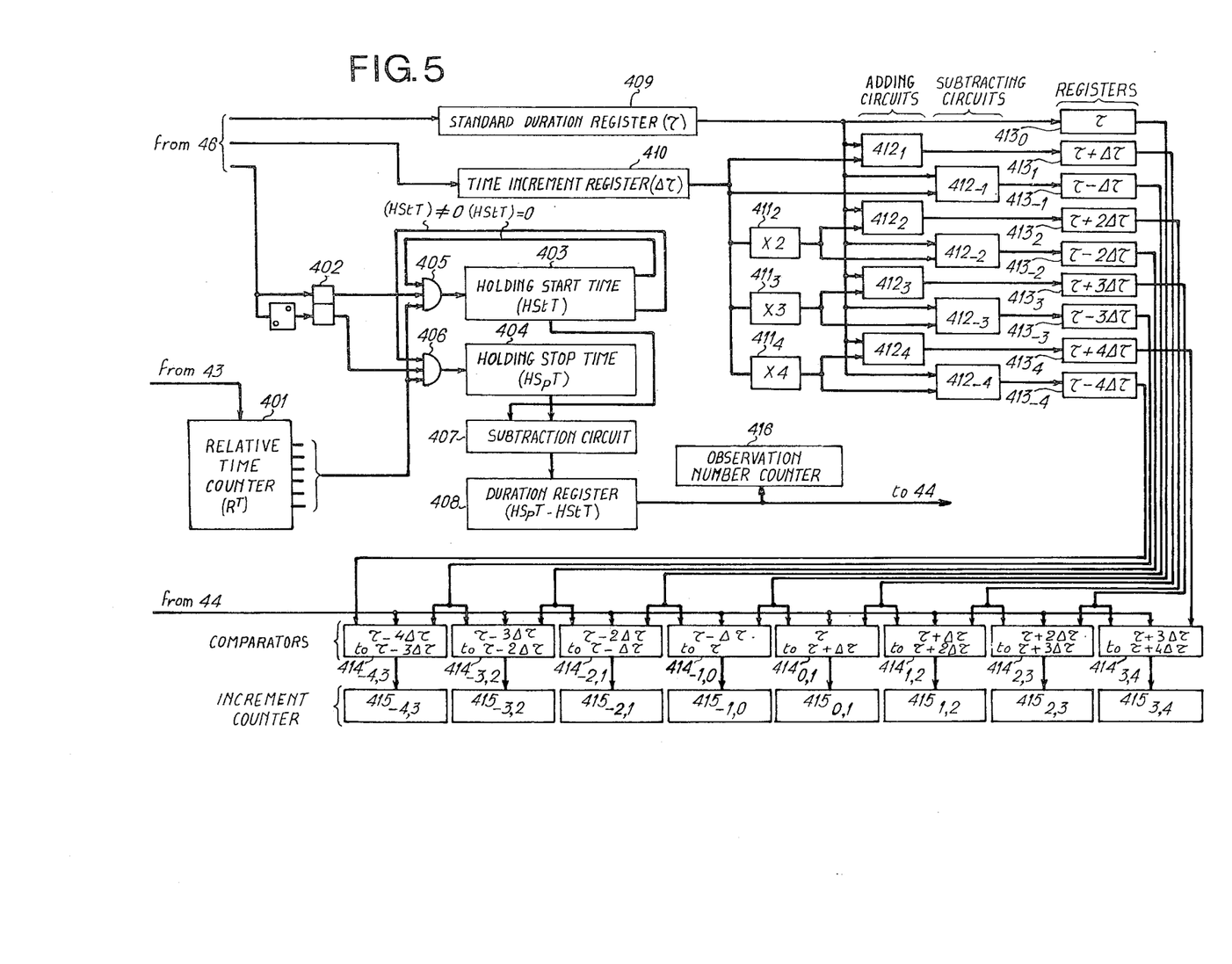
FIG. 5 is a block diagram of the portion of the computer serving to the measurement of the hold durations and their processing through time slots.

FIG. 5 represents the computer circuits determining the signal duration and classifying the measured durations in slots. The portion of the computer insuring programming sequencing through instruction catenation is well known in the state of the art and it is not necessary to describe it in detail in the present specification, indications given in relation with FIG. 3 being amply adequate for the purpose.

Clock 43 impulses are counted by relative time counter 401 and the signal whose duration is to be measured as transmitted by multiplexer 46 is received in flipflop 402. In other words, flipflop 402 passes to state one at the beginning of this signal and remains in this state as long as the signal lasts. The contents of counter 401 is transmitted in parallel, either in the holding start time register (HS*t*T) 403 at the beginning of the count, or in the holding stop time register (HS*p*T) 404 at the end of the count, through AND gates 405 and AND gates 406, respectively. AND gates 405 are open when flipflop 402 is at state one and register 403 (HS$t$T) has all its stages in state zero (register empty), and AND gates 406 are open when flipflop 402 is at state zero and register 403 (HS$t$T) has at least one of its stages in state one.

The respective contents of registers 403 and 404 are subtracted in subtractor circuit 407 and the subtraction results are inscribed in duration register 408.

Parameters consisting of the nominal time $\tau$ and the window width $\Delta\tau$ are received from multiplexer 46, respectively, in a nominal time register 409 and window width register 410. The contents of 409 is transferred into register $413_0$. Contents of 410 are multiplied by 2, 3 and 4, in multiplier circuits $411_2$, $411_3$, $411_4$, respectively, and quantities $\tau\pm\Delta\tau$, $\tau\pm2\Delta\tau$, $\tau\pm3\Delta\tau$, $\tau\pm4\Delta\tau$, are formed in adding circuits $412_1$, $412_2$, $412_3$, $412_4$, and in subtracting circuits $412_{-1}$, $412_{-2}$, $412_{-3}$, $412_{-4}$, and they are written in registers $413_1$, $413_{-1}$, $413_2$, $413_{-2}$, $413_3$, $413_{-3}$, $413_4$, $413_{-4}$.

Quantities in the first column of the following Table are applied to the comparators of the second column:

| | |
|---|---|
| $\tau-4\Delta\tau;\ \tau-3\Delta\tau$ | $414_{-4,3}$ |
| $\tau-3\Delta\tau;\ \tau-2\Delta\tau$ | $414_{-3,2}$ |
| $\tau-2\Delta\tau;\ \tau-\Delta\tau$ | $414_{-2,1}$ |
| $\tau-\Delta\tau;\ \tau$ | $414_{-1,0}$ |
| $\tau;\ \tau+\Delta\tau$ | $414_{0,1}$ |
| $\tau+\Delta\tau;\ \tau+2\Delta\tau$ | $414_{1,2}$ |
| $\tau+2\Delta\tau;\ \tau+3\Delta\tau$ | $414_{2,3}$ |
| $\tau+3\Delta\tau;\ \tau+4\Delta\tau$ | $414_{3,4}$ | and these comparators receive all the contents of register 408 which has been entered into write-and-read memory 44.

Each comparator emits an impulse when (HS$t$T-HS$p$T) is between its limits and these impulses are applied, respectively, to time slot counters $415_{-4,3}$, $415_{-3,2}$, $415_{-2,1}$, $415_{-1,0}$, $415_{0,1}$, $415_{1,2}$, $415_{2,3}$, $415_{3,4}$.

Figure 6:
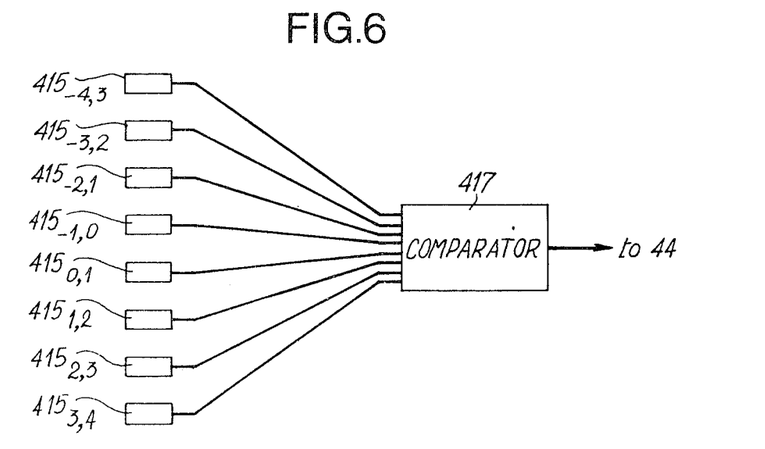
FIG. 6 is a block diagram of a multicomparator used for deriving a holding time mean value from a distribution of a plurality of values of said holding time.

It may happen that the nominal value $\tau$ of the hold time is unknown and is to be taken equal to the mean value of the distribution function represented by the contents of the time slot counters. For determining this mean value, the contents of the time slot counters $415_{-4,3}$, $415_{-3,2}$, $415_{-2,1}$, $415_{-1,0}$, $415_{0,1}$, $415_{1,2}$, $415_{2,3}$, $415_{3,4}$ are applied to comparator 417 which sends to memory 44 the common limit ($\tau\pm i\Delta\tau$) (with $i=0, 1, 2, 3$) of the two time slot counters which contain the larger amount. This common limit is the mean value. A new process of distribution is implemented while substituting for $\tau$, this mean value.

Figure 7:
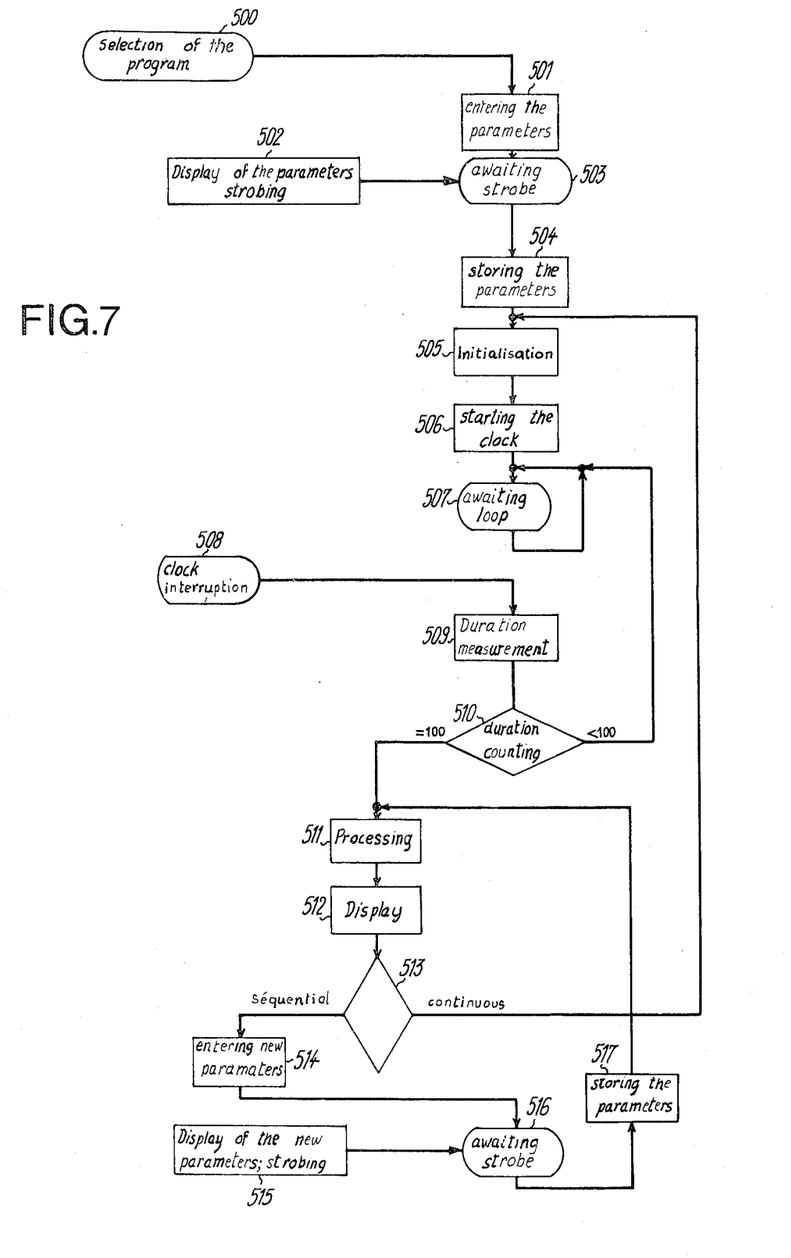
FIGS. 7 and 8 are algorithmic representations expliaining FIG. 3 and FIG. 5 logic part operation.

FIG. 7 shows the master observation and processing programming algorithm. At 500, the user calls the observation and processing programming by composing the initializing instruction number on coded wheels 11 and 12, and by entering on coded wheel 13 a 0 or a 1 depending on whether the desired programming is a continuous or a sequential programming. At 501, the green go-ahead light for parameter transmission turns on. At 502, the user inscribes as indicated previously the nominal value of the duration to measure and the window width. He may, for instance, enter 050040 on the coded wheels 11–16, and this would mean that the nominal value of duration is 400 ms and window width 50 ms if the clock is set to 10 ms, and would then push the validating button 5. During parameter composition and up to depressing push-button 5, the computer is at standby at 503. At 504, it stores in read-and-write memory 44 these parameters, at 505 it triggers the various logic circuits and at 506, is starts the clock 43 through wire 481. Awaiting the clock interrupt, the computer remains at standby on 507.

For each clock interrupt 508, the signal is sampled and the computer enters the sampling bit detected on wire 461 (509); then it increments the observation number counter 416 (510). If the mumber of observations is less than 100, the programming is looped from instruction 510 to instruction 507. If the number of observations is equal to 100, the computer passes to the processing instruction, that is to the window distribution sequence 511 then to the display instruction 512.

If the user has selected the continuous programming, the computer goes from instruction 513 denoting programming selection to initializing instruction 505 for a new series of observations.

If the user has selected the sequential programming, the computer goes to the go-ahead instruction to transmit new parameters 514, and the green indicator light 4 goes on. The user enters new parameters and depresses validating push-button 5. During this new parameters composition and until the push-button 5 is depressed, the computer is in standby at 516. At 517, the computer stores in read-and-write memory 44 these new parameters. From instruction 517, we now return to processing instruction 511.

Figure 8:
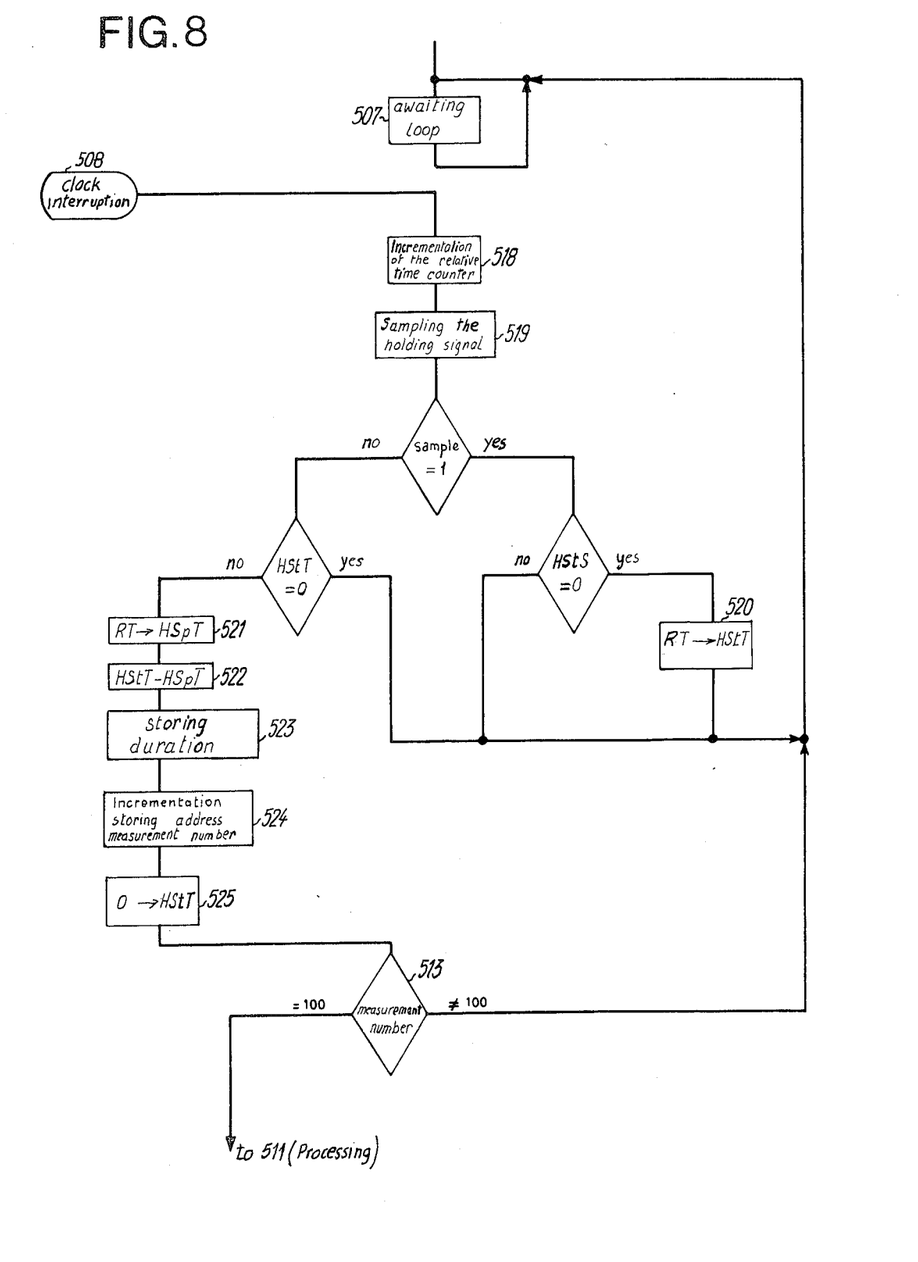

FIG. 8 shows in greater detail the observation programming up to observation number counting in counter 416. For each clock interrupt, the clock signal increments by one unit the relative hourly counter 401 (instruction 518). For each clock impulse, the signal whose duration is to be measured is sampled in the multiplexer 46 (instruction 519). If the sample is a one and if the holding start time register 403 is set at zero, the relative hour is transferred in this register (instruction 520). Otherwise, we return to the standby loop 507. If the sample is a zero and if the holding start time register 403 is not set on zero, the relative hour is transferred into the holding stop time register 404 (instruction 521). Otherwise, we return to the standby loop 507. During the next instruction 522, the subtracter circuit 407 carriers out the (HS$t$T-HS$p$T) subtraction, then it stores this quantity in the read-and-write memory 44 (instruction 523) and increments by one unit the storing address in the memory 44, and the counter of observation number 416 (instruction 524). Afterwards, it zero resets the relative hourly counter 401 (instruction 525).

When counter 416 has reached 100, the processing programming is initialized. Otherwise, the programming reloops on instruction 507.

What we claim is:

1. An analyzer unit to measure signal duration values and to classify them in function of their deviations in relation to a nominal duration value, said analyzer unit including means for sampling signals all having the same nominal duration value $\tau$ with a preset recurrence period, means for measuring and storing the successive duration values of the signals, means for counting the signal duration measurements carried out by said unit up to a predetermined number, means for defining a duration increment $\Delta\tau$, means for adding to and substracting from said nominal duration value said duration increment and the multiples thereof, a plurality of comparators each having a lower and an upper digital limits and defining adjacent time slots, the upper and lower limits of a given time slot being respectively equal to $(\tau - n\Delta\tau)$ and $(\tau - (n-1)\Delta\tau)$ where $n$ is an integer, means for applying the stored duration values to said comparators and a plurality of counters respectively associated with said comparators and receiving therefrom counting pulses when the durations of the applied duration values respectively fall within the time slots of said comparators.

2. An analyzer unit to measure signal duration values and to classify them in function of their deviations in relation to a nominal duration value, said analyzer unit including means for sampling signals all having the same nominal duration value $\tau$ with a preset recurrence period, means for measuring and storing the successive duration values of the signals, means for counting the signal duration measurements carried out by said unit up to a predetermined number, means for defining a duration increment $\Delta\tau$, means for adding to and substracting from said nominal duration value said duration increment and the multiples thereof, a plurality of first comparators each having a lower and an upper digital limits, and defining adjacent time slots, the upper and lower limits of a given time slot being respectively equal to $(\tau - n\Delta\tau)$ and $(\tau - (n-1)\Delta\tau)$ where $n$ is an integer, means for applying the the stored duration values to said comparators, a plurality of counters respectively associated with said comparators and receiving therefrom counting pulses when the durations of the applied duration values respectively fall within the time slots of said comparators, a second comparator for comparing the contents in said counters and selecting the two counters having the greater contents and means for substituting for said nominal duration value the common limit of the two time slots defined by the comparators associated with the two selected counters.

3. An analyzer unit to measure signal duration values and to classify them in function of their deviations in relation to a nominal duration value according to claim 1, in which the means for measuring and storing the successive duration values of the signals comprises clock means generating clock pulses with a preset recurrence period, store means activated by the signals during the whole duration thereof, means for counting the clock pulses, a signal start time register, means for transferring the count of said counting means into said signal start time register when the same is empty and simultaneously the store means is activated, a signal stop time register, means for transferring the count of said counting means into signal stop time register when the same is not empty and simultaneously the store means is inactivated and means for subtracting the contents of said signal start time register from the contents of said signal stop time register.

* * * * *